US011934679B2

United States Patent
Meiri et al.

(10) Patent No.: US 11,934,679 B2
(45) Date of Patent: Mar. 19, 2024

(54) SYSTEM AND METHOD FOR SEGMENTING VOLUMES ACROSS A MULTI-NODE STORAGE SYSTEM

(71) Applicant: EMC IP Holding Company, LLC, Hopkinton, MA (US)

(72) Inventors: David Meiri, Somerville, MA (US); Vinay G. Rao, Bangalore (IN); Sanjib Mallick, Bangalore (IN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/076,141

(22) Filed: Oct. 21, 2020

(65) Prior Publication Data

US 2022/0121382 A1    Apr. 21, 2022

(51) Int. Cl.
    *G06F 3/06*    (2006.01)
(52) U.S. Cl.
    CPC .......... *G06F 3/0644* (2013.01); *G06F 3/0611* (2013.01); *G06F 3/0619* (2013.01); *G06F 3/0629* (2013.01); *G06F 3/067* (2013.01); *G06F 3/0683* (2013.01)
(58) Field of Classification Search
    None
    See application file for complete search history.

(56) References Cited

U.S. PATENT DOCUMENTS

| | | | | |
|---|---|---|---|---|
| 7,840,730 | B2 * | 11/2010 | D'Amato | G06F 3/062 |
| | | | | 709/226 |
| 8,041,735 | B1 * | 10/2011 | Lacapra | G06F 16/182 |
| | | | | 707/783 |
| 2010/0228915 | A1 * | 9/2010 | Ogihara | G06F 11/2094 |
| | | | | 711/114 |
| 2013/0124674 | A1 * | 5/2013 | Matsumoto | G06F 3/0685 |
| | | | | 709/217 |
| 2015/0244804 | A1 * | 8/2015 | Warfield | G06F 3/067 |
| | | | | 709/219 |
| 2017/0318092 | A1 * | 11/2017 | Maredia | G06F 9/5061 |
| 2018/0062986 | A1 * | 3/2018 | Murgia | H04L 45/124 |
| 2020/0363957 | A1 * | 11/2020 | Patel | G06F 3/067 |
| 2020/0401546 | A1 * | 12/2020 | Mehta | G06F 13/124 |
| 2021/0149591 | A1 * | 5/2021 | De Roeck | G06F 3/0619 |

* cited by examiner

*Primary Examiner* — Edward J Dudek, Jr.
*Assistant Examiner* — Ralph A Verderamo, III
(74) *Attorney, Agent, or Firm* — Brian J. Colandreo; Heath M. Sargeant; Holland & Knight LLP (57) ABSTRACT

A method, computer program product, and computing system for dividing a volume into a plurality of segments. The plurality of segments may be assigned to a plurality of nodes of a multi-node storage system. One or more input/output (IO) request paths for accessing the plurality of segments may be defined based upon, at least in part, assigning the plurality of segments to the plurality of nodes.

20 Claims, 5 Drawing Sheets

SYSTEM AND METHOD FOR SEGMENTING VOLUMES ACROSS A MULTI-NODE STORAGE SYSTEM

BACKGROUND

Storing and safeguarding electronic content may be beneficial in modern business and elsewhere. Accordingly, various methodologies may be employed to protect and distribute such electronic content.

In a multi-node storage system, a host can connect to the storage system through multiple nodes and have all volumes serviced by all paths. However, the nodes may not be symmetric as, according to conventional approaches, each volume may have an optimized path to one node and non-optimized paths to the other nodes. For each volume, there may be a preferred node that "owns" the volume meta-data. Additionally, this node might also be the only node caching data for the volume. In some implementations, a host I/O request may be performed faster if it is serviced by the optimized node.

In some implementations, a host (input/output) IO request to the non-optimized node may either need to be forwarded for execution at the other node, or, alternatively, require a locking mechanism to let the non-optimized node execute the IO request, while negotiating with its peer changes to data and meta-data. Either way, performance on the non-optimized node may be significantly worse. Typically, volumes may be shared between the multiple nodes (e.g., two nodes), so that every node can service IO requests to all volumes, but each volume may be optimized to work on one of the nodes.

Accordingly, these conventional approaches have limitations. For example, a single volume's performance may be limited to half of the maximum bandwidth of the system. Additionally, it may be more difficult to balance performance between nodes. For example, it is possible that some volumes are busier than others, and by chance, they may be concentrated in one of the nodes.

SUMMARY OF DISCLOSURE

In one example implementation, a computer-implemented method executed on a computing device may include, but is not limited to, dividing a volume into a plurality of segments. The plurality of segments may be assigned to a plurality of nodes of a multi-node storage system. One or more input/output (IO) request paths for accessing the plurality of segments may be defined based upon, at least in part, assigning the plurality of segments to the plurality of nodes.

One or more of the following example features may be included. Metadata associated with one or more segments assigned to a node may be stored at that node. User data associated with the one or more segments assigned to a node may be cached at that node. An IO request referencing at least one segment of the plurality of segments may be received. A node to which the at least one segment is assigned may be determined. The IO request may be sent to the node to which the at least one segment is assigned via an IO request path to the node to which the at least one segment is assigned. The IO request may reference a first segment assigned to a first node and a second segment assigned to a second node. The IO request may be divided into a first portion referencing the first segment assigned to the first node and a second portion referencing the second segment assigned to the second node. The first portion of the IO request may be processed via the first node. The second portion of the IO request may be processed via the second node. Storing the metadata associated with the one or more segments assigned to the node may include storing, on each node, a copy of the metadata associated with the one or more segments assigned to each other node; generating a shared lock for each page of the metadata associated with the one or more segments; and providing, to the node to which the one or more segments are assigned, ownership of the shared lock for each page of the metadata associated with the one or more segments assigned to the node. A node failure may be identified within the multi-node storage system, thus defining at least one failed node. One or more segments assigned to the at least one failed node may be reassigned to one or more surviving nodes.

In another example implementation, a computer program product resides on a computer readable medium that has a plurality of instructions stored on it. When executed by a processor, the instructions cause the processor to perform operations that may include, but are not limited to, dividing a volume into a plurality of segments. The plurality of segments may be assigned to a plurality of nodes of a multi-node storage system. One or more input/output (IO) request paths for accessing the plurality of segments may be defined based upon, at least in part, assigning the plurality of segments to the plurality of nodes.

One or more of the following example features may be included. Metadata associated with one or more segments assigned to a node may be stored at that node. User data associated with the one or more segments assigned to a node may be cached at that node. An IO request referencing at least one segment of the plurality of segments may be received. A node to which the at least one segment is assigned may be determined. The IO request may be sent to the node to which the at least one segment is assigned via an IO request path to the node to which the at least one segment is assigned. The IO request may reference a first segment assigned to a first node and a second segment assigned to a second node. The IO request may be divided into a first portion referencing the first segment assigned to the first node and a second portion referencing the second segment assigned to the second node. The first portion of the IO request may be processed via the first node. The second portion of the IO request may be processed via the second node. Storing the metadata associated with the one or more segments assigned to the node may include storing, on each node, a copy of the metadata associated with the one or more segments assigned to each other node; generating a shared lock for each page of the metadata associated with the one or more segments; and providing, to the node to which the one or more segments are assigned, ownership of the shared lock for each page of the metadata associated with the one or more segments assigned to the node. A node failure may be identified within the multi-node storage system, thus defining at least one failed node. One or more segments assigned to the at least one failed node may be reassigned to one or more surviving nodes.

In another example implementation, a computing system includes at least one processor and at least one memory architecture coupled with the at least one processor, wherein the at least one processor configured to divide a volume into a plurality of segments, wherein the at least one processor is further configured to assign the plurality of segments to a plurality of nodes of a multi-node storage system, and wherein the at least one processor is further configured to define one or more input/output (IO) request paths for accessing the plurality of segments based upon, at least in part, assigning the plurality of segments to the plurality of nodes.

One or more of the following example features may be included. Metadata associated with one or more segments assigned to a node may be stored at that node. User data associated with the one or more segments assigned to a node may be cached at that node. An IO request referencing at least one segment of the plurality of segments may be received. A node to which the at least one segment is assigned may be determined. The IO request may be sent to the node to which the at least one segment is assigned via an IO request path to the node to which the at least one segment is assigned. The IO request may reference a first segment assigned to a first node and a second segment assigned to a second node. The IO request may be divided into a first portion referencing the first segment assigned to the first node and a second portion referencing the second segment assigned to the second node. The first portion of the IO request may be processed via the first node. The second portion of the IO request may be processed via the second node. Storing the metadata associated with the one or more segments assigned to the node may include storing, on each node, a copy of the metadata associated with the one or more segments assigned to each other node; generating a shared lock for each page of the metadata associated with the one or more segments; and providing, to the node to which the one or more segments are assigned, ownership of the shared lock for each page of the metadata associated with the one or more segments assigned to the node. A node failure may be identified within the multi-node storage system, thus defining at least one failed node. One or more segments assigned to the at least one failed node may be reassigned to one or more surviving nodes.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
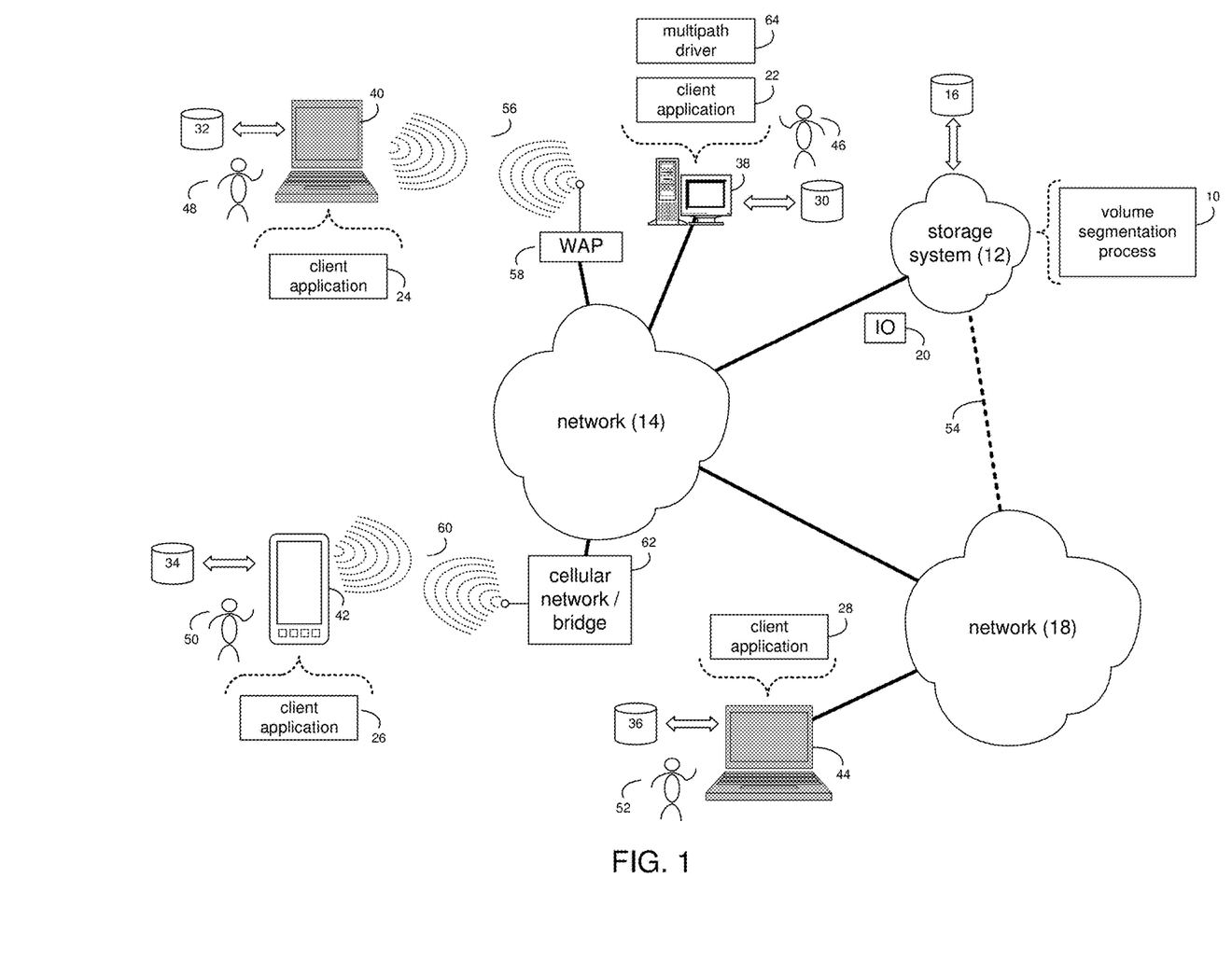
FIG. 1 is an example diagrammatic view of a storage system and a volume segmentation process coupled to a distributed computing network according to one or more example implementations of the disclosure.

System Overview:

Referring to FIG. 1, there is shown volume segmentation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of volume segmentation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of volume segmentation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a volume segmentation process, such as volume segmentation process 10 of FIG. 1, may include but is not limited to, dividing a volume into a plurality of segments. The plurality of segments may be assigned to a plurality of nodes of a multi-node storage system. One or more input/output (IO) request paths for accessing the plurality of segments may be defined based upon, at least in part, assigning the plurality of segments to the plurality of nodes.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
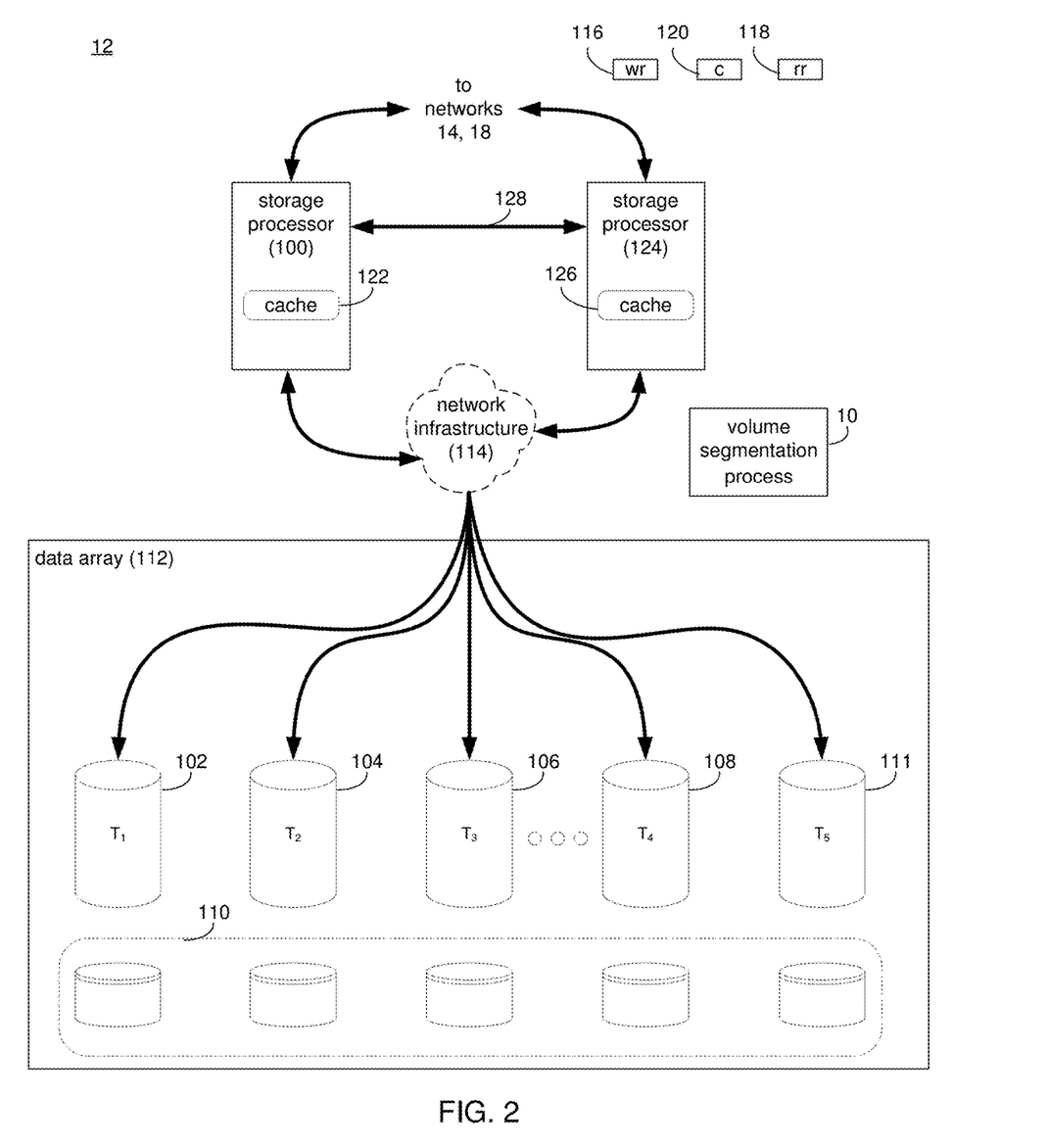
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of volume segmentation process 10. The instruction sets and subroutines of volume segmentation process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of volume segmentation process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of volume segmentation process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of volume segmentation process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

Figure 3:
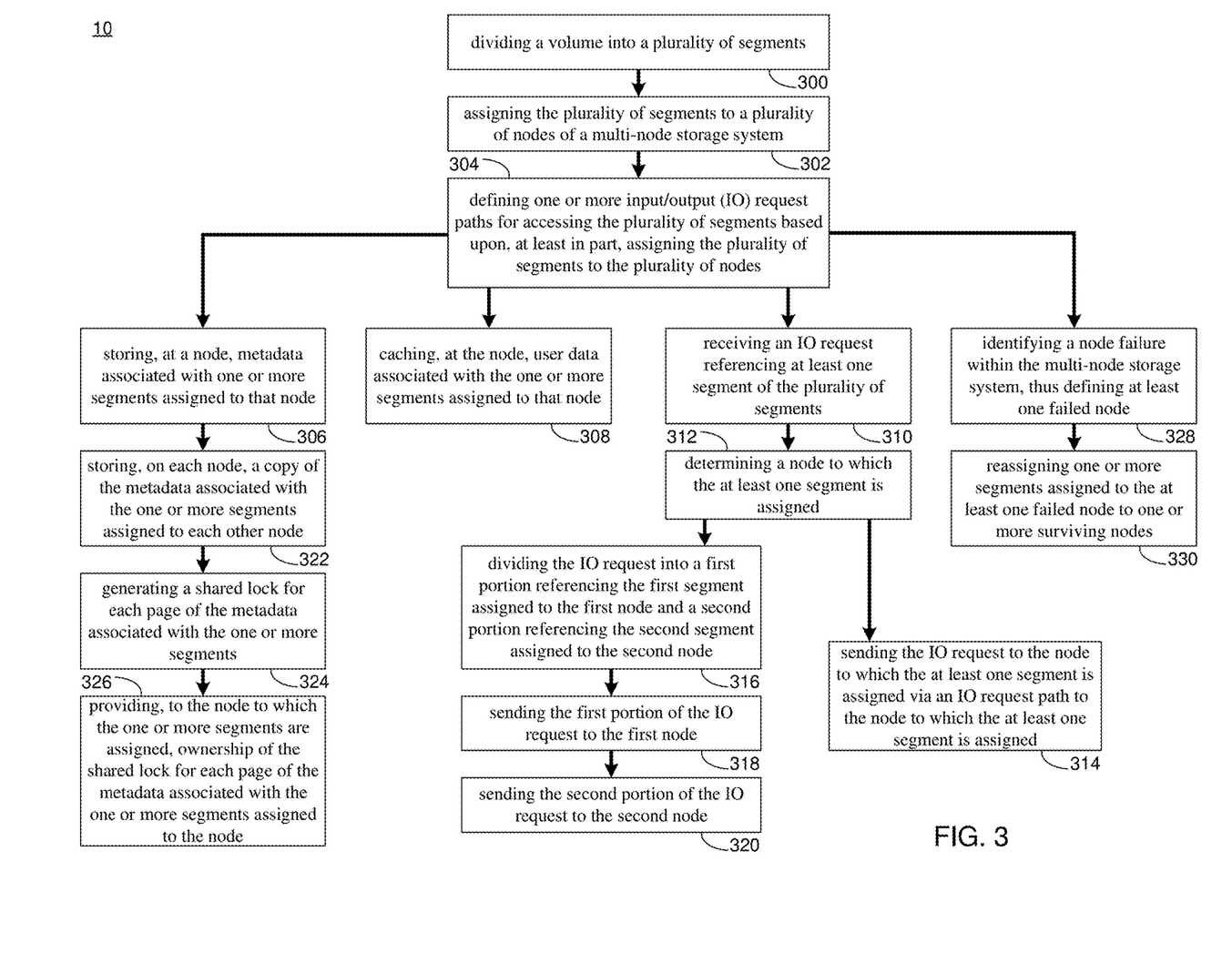
FIG. 3 is an example flowchart of volume segmentation process according to one or more example implementations of the disclosure.
Figure 4:
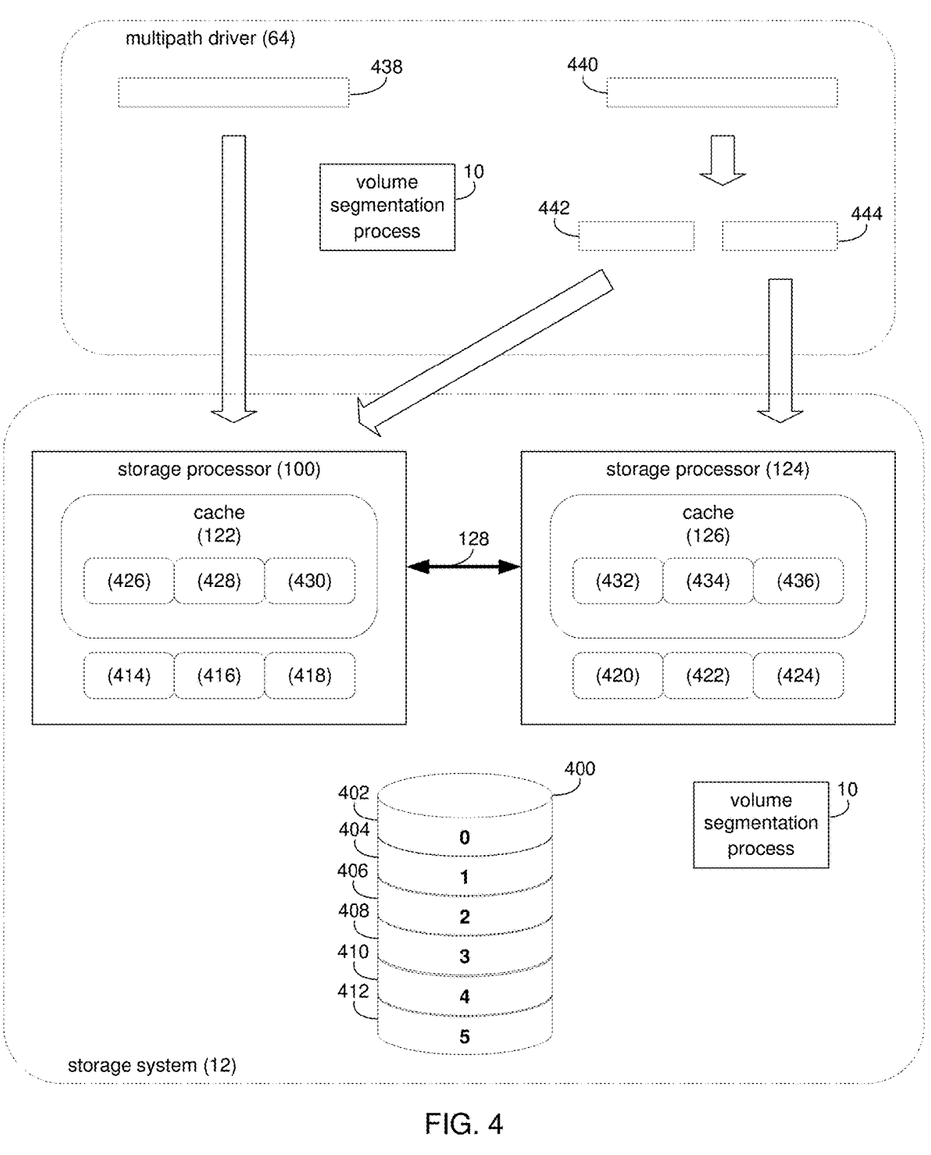
FIGS. 4-5 are example diagrammatic views of the storage system of FIG. 1 according to one or more example implementations of the disclosure.
Figure 5:
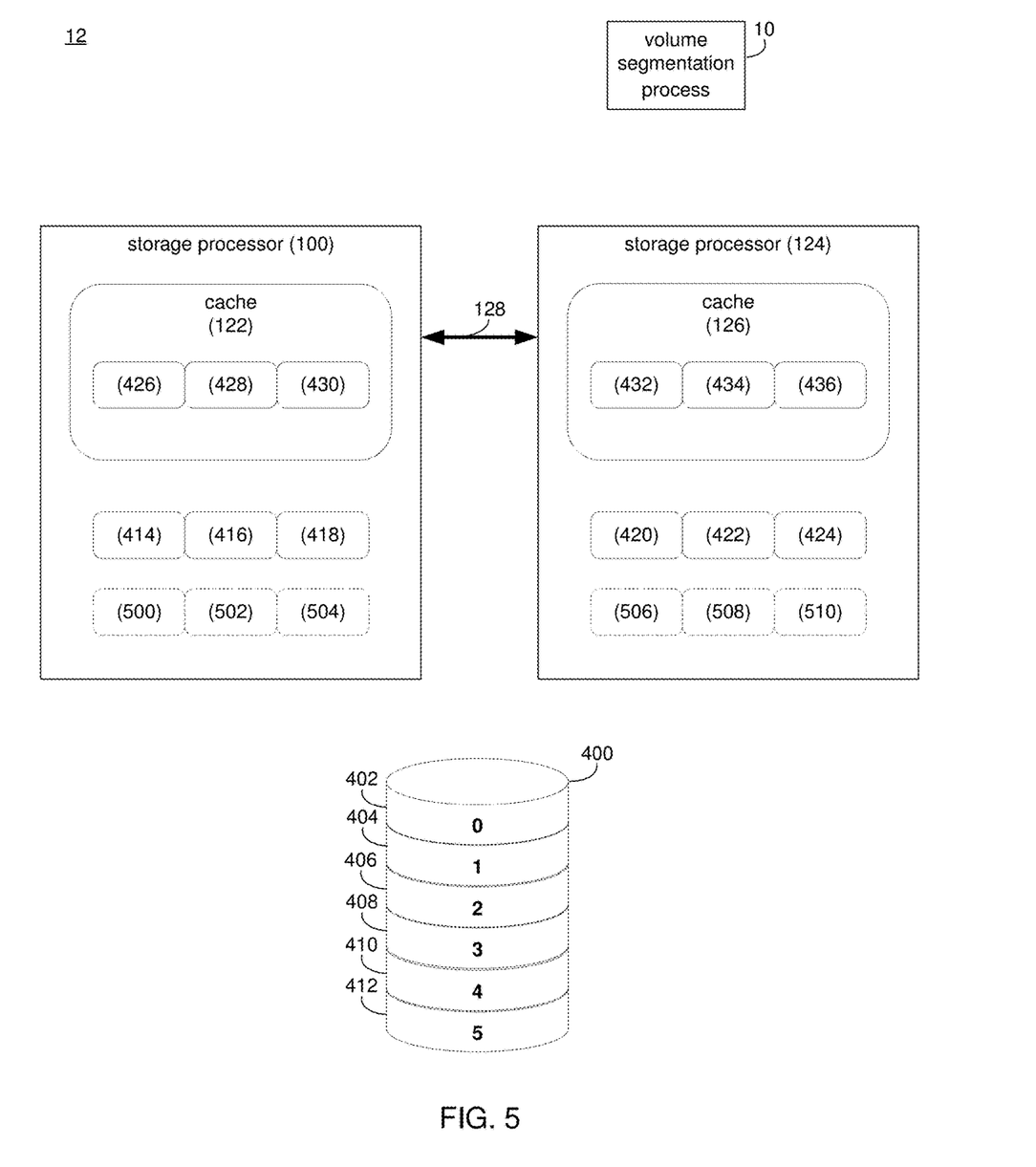

The Volume Segmentation Process:

Referring also to the examples of FIGS. 3-5 and in some implementations, volume segmentation process 10 may divide 300 a volume into a plurality of segments. The plurality of segments may be assigned 302 to a plurality of nodes of a multi-node storage system. One or more input/output (IO) request paths for accessing the plurality of segments may be defined 304 based upon, at least in part, assigning the plurality of segments to the plurality of nodes.

As will be discussed in greater detail below, volume segmentation process 10 may address challenges with conventional approaches to servicing volumes via a multi-node system. For example, in a multi-node storage system, a host can connect to the storage system through multiple nodes and have all volumes serviced by all paths. However, the nodes may not be symmetric as, according to conventional approaches, each volume may have an optimized path to one node and non-optimized paths to the other nodes. For each volume, there may be a preferred node that "owns" the volume meta-data. Additionally, this node might also be the only node caching data for the volume. In some implementations, a host I/O request may be performed faster if it is serviced by the optimized node. In some implementations, a host I/O request to the non-optimized node may either need to be forwarded for execution at the other node, or, alternatively, may require a locking mechanism to let the non-optimized node execute the I/O request, while negotiating with its peer, changes to data and meta-data. Either way, performance on the non-optimized node may be significantly worse.

Typically, volumes may be shared between the multiple nodes (e.g., two nodes), so that every node can service I/O requests to all volumes, but each volume may be optimized to work on one of the nodes. In some implementations, conventional approaches may establish optimized vs. non-optimized paths with Asymmetric Logical Unit Assignment (ALUA). As is known in the art, ALUA is a multipath storage protocol that allows a volume to be accessible to multiple nodes but may only specify one of the nodes as "owning" the volume. Accordingly, ALUA allows for the designation of optimized paths (i.e., direct path to the node that owns the volume) and non-optimized paths (i.e., indirect path through one node that does not own the volume to a node that owns the volume).

Accordingly, these conventional approaches have limitations. For example, a single volume's performance may be limited to half of the maximum bandwidth of the system. Additionally, it may be more difficult to balance performance between nodes. For example, it is possible that some volumes are busier than others, and by chance they may be concentrated in one of the nodes. As will be discussed in greater detail below, implementations of the present disclosure may allow a more symmetrical servicing of volumes for multiple nodes of a multi-node storage system without impacting performance negatively by requiring excessive inter-node communication.

In some implementations, volume segmentation process 10 may divide 300 a volume into a plurality of segments. In some implementations, a volume may generally include a logical memory device configured for storing data. In some implementations, a volume may be accessible by multiple nodes of a multi-node storage system. As shown in the example of FIG. 2 and in some implementations, a volume may be generated for a storage system (e.g., mapped to underlying physical memory). In some implementations, multiple nodes may access the volume and may present the volume to one or more hosts (e.g., client devices 38, 40, 42, 44). In this manner, a host may access a volume with multiple nodes. In some implementations, a volume may have a storage capacity that determines how much data may be stored in the volume.

As will be discussed in greater detail below, volume segmentation process 10 may perform one or more actions via a storage system and one or more actions via a multipath driver of a host computing device. In this manner, volume segmentation process 10 may execute via a storage system, a host, and/or combinations thereof. Accordingly, while reference is made to volume segmentation process 10 performing actions on both the storage system and the multipath driver, it will be appreciated that volume segmentation process 10 may include a storage system-side sub-process configured to perform action via the storage system and a host-side sub-process configured to perform actions via the host (e.g., via the multipath driver). While an example has been provided of e.g., two sub-processes of volume segmentation process 10, it will be appreciated that volume segmentation process 10 may include any number of sub-processes executed via any number of devices within the scope of the present disclosure.

In some implementations, volume segmentation process 10 may divide 300 the volume into a plurality of segments by dividing the storage capacity of the volume into a plurality of segments. In some implementations, a segment may include a defined portion of storage space. For example, a segment may include a e.g. one gigabyte slice of a volume. It will be appreciated that any segment size may be used within the scope of the present disclosure when dividing 300 a volume into a plurality of segments. While the above example refers to a single volume, it will be appreciated that volume segmentation process 10 may divide 300 multiple volumes into a plurality of segments within the scope of the present disclosure.

In some implementations, volume segmentation process 10 may divide 300 the volume into a plurality of segments based upon, at least in part, a target number of segments and/or a target segment size. For example, suppose volume segmentation process 10 is configured to divide 300 a volume into e.g., ten equally-sized segments. In this example, volume segmentation process 10 may divide the total storage capacity of the volume by e.g., ten to determine the size of each segment. In another example, suppose volume segmentation process 10 is configured to divide 300 a volume into a plurality of segments with a target segment size. In this example, volume segmentation process 10 may divide the total storage capacity into a plurality of segments of the target segment size. However, it will be appreciated that a volume may be divided 300 into any number or size of segments within the scope of the present disclosure.

Referring also to the example of FIG. 4 and in some implementations, suppose a storage system (e.g., storage system 12) includes a volume (e.g., volume 400). In this example, volume 400 may have a storage capacity of e.g., six gigabytes. Volume segmentation process 10 may divide 300 volume 400 into a plurality of e.g., one gigabyte segments. For example, volume segmentation process 10 may divide 300 the e.g., six gigabyte storage capacity of volume 400 into e.g., six, one gigabyte segments (e.g., segments 402, 404, 406, 408, 410, 412). While an example storage capacity of six gigabytes has been provided, it will be appreciated that a volume with any storage capacity may be divided 300 into any number of segments within the scope of the present disclosure.

In some implementations, volume segmentation process 10 may assign 302 the plurality of segments to a plurality of nodes of a multi-node storage system. As discussed above and in some implementations, according to conventional approaches, a volume may be generated to be accessible to multiple nodes of a multi-node storage system. However, one node may be configured to "own" or manage the volume. As discussed above, the node that "owns" the volume may be configured to access the volume via an optimized path while other nodes that do not "own" the volume may be configured to access the volume via an non-optimized node. In some implementations, as opposed to a node "owning" an entire volume, volume segmentation process 10 may assign 302 the plurality of segments to a plurality of nodes of a multi-node storage system. In some implementations and as will be described in greater detail below, assigning 302 a segment to a node may include configuring the node to process IO requests referencing the segment. In some implementations, volume segmentation process 10 may assign 302 an equal number of segments to each node of the multi-node storage system. In this manner, access to an individual volume may be evenly spread among multiple nodes.

Referring again to the example of FIG. 4 and in some implementations, volume segmentation process 10 may assign 302 the plurality of segments (e.g., segments 402, 404, 406, 408, 410, 412) to a plurality of nodes (e.g., storage processors 100, 124) of the multi-node storage system (e.g., storage system 12). In this example, volume segmentation process 10 may assign 302 an equal number of segments to each node. For example, volume segmentation process 10 may assign 302 the even-numbered segments (e.g., segments 402, 406, 410) to storage processor 100 and the odd-numbered segments (e.g., segments 404, 408, 412) to storage processor 124.

In some implementations, volume segmentation process 10 may define 304 one or more input/output (IO) request paths for accessing the plurality of segments based upon, at least in part, assigning the plurality of segments to the plurality of nodes. In some implementations, volume segmentation process 10 may communicate with a multipath driver deployed on one or more hosts to define 304 one or more IO request paths for accessing the plurality of segments based upon, at least in part, assigning the plurality of segments to the plurality of nodes. A multipath driver may generally include host-based software that is configured to provide automated data path management and load-balancing capabilities for heterogeneous server, network and storage deployed in physical and virtual environments. An example of a multipath driver may include PowerPath Intelligent Multipathing Software of Dell EMC of Hopkinton, Massachusetts. However, it will be appreciated that other multipath drivers may be used within the scope of the present disclosure.

In some implementations, a multipath driver (e.g., multipath driver 64 as shown in FIG. 1) may be configured to send one or more configuration commands to the storage system. In some implementations, volume segmentation process 10 may provide information regarding the assignment of the plurality of segments to each node via the configuration commands. In this manner, the multipath driver may receive and store the assignments of segments to particular nodes. In some implementations, volume segmentation process 10 may define 304 one or more IO request paths by determining which segment(s) are referenced by a particular IO request and identifying the node to which the segment(s) referenced by the IO request is assigned. In this manner, volume segmentation process 10 may define 304, via a multipath driver, one or more IO request paths for IO requests referencing or addressed to particular segments. In some implementations, volume segmentation process 10 may, via the multipath driver, configure each defined 304 IO request path as ALUA Optimized (if ALUA is supported) and may redirect IO requests to the node to which the segment is assigned based on the segment the IO references or is addressed to.

Referring again to the examples of FIGS. 1 and 4, suppose volume segmentation process 10 assigns 302 segments 402, 406, 410 to storage processor 100 and segments 404, 408, 412 to storage processor 124. In this example, volume segmentation process 10 may communicate these assignments to multipath driver 64 of one or more hosts. In some implementations, volume segmentation process 10 may, via multipath driver 64, define 304 one or more IO request paths for accessing the plurality of segments based upon, at least in part, assigning the plurality of segments to the plurality of nodes. In this example, volume segmentation process 10 may define 304 IO request paths for segments 402, 406, 410 to include a path between the host(s) and storage processor 100 and IO request paths for segments 404, 408, 412 to include a path between the host(s) and storage processor 124. As will be discussed in greater detail below, each of the assigned nodes of the IO request paths may store data (e.g., metadata and/or a cached copy of user data) associated with a particular segment. In this manner, volume segmentation process 10 may allow for a more efficient processing of IO requests referencing or addressed to various segments by utilizing IO request paths to the node to which the segments are assigned.

In some implementations, defining 304 the one or more IO request paths may include defining IO request paths from other nodes to a node to which the segment(s) referenced by the IO request are assigned. For example, suppose an IO request is received at storage processor 100 but references segment 404 of volume 400. In this example, volume segmentation process 10 may define 304 an IO request path from a host to storage processor 100 and then to storage processor 124 (e.g., via connection 128). In this manner, the IO request may be forwarded to the node to which the segment referenced by the IO request, is assigned for more efficient processing by storage processor 124 than storage processor 100.

In some implementations, defining 304 the one or more IO request paths may be based upon, at least in part, a type of data of the IO request. For example, suppose an IO request references metadata of a particular segment. In some implementations, volume segmentation process 10 may define 304 one or more IO request paths for IO requests referencing metadata of a particular segment of a storage volume. In another example, suppose an IO request references user data of a particular segment. In some implementations, volume segmentation process 10 may define 304 one or more IO request paths for IO requests referencing user data of a particular segment. In this manner, volume segmentation process 10 may define 304 various IO request paths (e.g., IO request paths for accessing metadata and/or user data) to increase the efficiency of the storage system's IO request processing.

In some implementations, volume segmentation process 10 may store 306, at a node, metadata associated with one or more segments assigned to that node. In some implementations, each node may be responsible for the metadata for the segments assigned to that respective node. In some implementations, volume segmentation process 10 may store 306 the metadata associated with the one or more segments assigned to a particular node. In some implementations, by storing 306 the metadata associated with the segments assigned to a particular node at that node, volume segmentation process 10 may be configured to more efficiently respond to IO requests referencing or addressed to a particular segment. In some implementations, volume segmentation process 10 may store a secondary copy on disk or on a higher-latency persistent storage device. In this manner and as will be discussed in greater detail below, the metadata associated with a segment may be obtained even when a node to which the segment is assigned, fails or is otherwise inaccessible.

Referring again to the example of FIG. 4 and in some implementations, volume segmentation process 10 may store 306, at a node, metadata associated with one or more segments assigned to that node. For example, metadata associated with segments 402, 406, and 410 may be stored 306 at storage processor 100 as these segments are assigned to storage processor 100. In this example, metadata 414 (e.g., one or more metadata pages) may be associated with segment 402, metadata 416 may be associated with segment 406, and metadata 418 may be associated with segment 410. Metadata associated with segments 404, 408, and 412 may be stored 306 at storage processor 124 as these segments are assigned to storage processor 124. In this example, metadata 420 may be associated with segment 404, metadata 422 may be associated with segment 408, and metadata 424 may be associated with segment 412. As discussed above, a copy of the metadata of each segment may be stored on disk (e.g., at disk array 112) and/or via another persistent storage device(s).

In some implementations, volume segmentation process 10 may cache 308, at a node, user data associated with the one or more segments assigned to that node. In some implementations, user data may generally include the data of an IO request that may be stored in a volume. In some implementations, volume segmentation process 10 may cache 308 a user data associated with the one or more segments assigned to a particular node. For example, volume segmentation process 10 may cache 308 user data associated with the one or more segments assigned to a particular node in a cache memory system associated with that node. In this manner, an IO request addressed to a segment assigned to a particular node may be processed more efficiently/more quickly by utilizing a cached copy of the user data associated with that segment.

Referring again to the example of FIG. 4 and in some implementations, volume segmentation process 10 may cache 308, at a node, user data associated with the one or more segments assigned to that node. For example, user data associated with segments 402, 406, and 410 may be cached 308 at cache 122 of storage processor 100 as these segments are assigned 302 to storage processor 100. In this example, user data 426 may be associated with segment 402, user data 428 may be associated with segment 406, and user data 430 may be associated with segment 410. User data associated with segments 404, 408, and 412 may be cached 308 at cache 126 of storage processor 124 as these segments are assigned to storage processor 124. In this example, user data 432 may be associated with segment 404, user data 434 may be associated with segment 408, and user data 436 may be associated with segment 412. While the example of FIG. 4 includes cached user data from each segment assigned to each storage processor, it will be appreciated that, during operation of the storage system, the cache of each storage system may include user data from only a portion of the segments assigned to that node based on the IO requests referencing a particular segment of the volume.

In some implementations, volume segmentation process 10 may receive 310 an IO request referencing at least one segment of the plurality of segments. For example, a host IO request may be received 310 and/or generated by a host. As discussed above, the IO request may reference at least one segment of the volume. In some implementations, volume segmentation process 10 may determine 312, at the multipath driver, a node to which the at least one segment, referenced by the IO request, is assigned. As discussed above, volume segmentation process 10 may define 304 one or more IO request paths for accessing the plurality of segments based upon, at least in part, assigning the plurality of segments to the plurality of nodes. In some implementations, volume segmentation process 10 may, via a multipath driver, determine which segments the IO request is referencing or addressing. In some implementations, volume segmentation process 10 may send 314 the IO request to the node to which the at least one segment is assigned via an IO request path to the node to which the at least one segment is assigned.

Referring again to the example of FIG. 4 and in some implementations, suppose an IO request (e.g., IO request 438) is received 310 at multipath driver 64 and that IO request 438 references or is addressed to segment 408 of volume 400. Volume segmentation process 10 may determine 312, via multipath driver 64, a node to which the at least one segment, referenced by the IO request, is assigned. In this example, volume segmentation process 10 may determine 312 that segment 408 is assigned to storage processor 124 and may send 314 IO request 438 to storage processor 124 via an IO request path defined 304 by volume segmentation process 10 to storage processor 124. Accordingly, volume segmentation process 10 may forward IO request 438 from storage processor 100 to storage processor 124 via connection 128.

In another example, suppose IO request 438 references or is addressed to segment 410 of volume 400. Volume segmentation process 10 may determine 312 that segment 410 is assigned to storage processor 100 and may send 314 IO request 438 to storage processor 100 via an IO request path to storage processor 100. In this example, storage processor 100 may receive and process IO request 438.

In some implementations, the IO request may reference a first segment assigned to a first node and a second segment assigned to a second node. In some implementations, an IO request may reference multiple segments assigned to different nodes. For example, an IO request that crosses a segment boundary (i.e., references more than one segment), may be processed on either node. However, this may introduce inefficiencies.

In some implementations, volume segmentation process 10 may divide 316 the IO request into a first portion referencing the first segment assigned to the first node and a second portion referencing the second segment assigned to the second node. In some implementations, an IO request may be divided 316 or broken, via a multipath driver, into a first portion (for one or more segments assigned to a first node) and a second portion (for one or more segments assigned to a second node). In some implementations, volume segmentation process 10 may send 318 the first portion of the IO request to the first node and may send 320 the second portion of the IO request to the second node. As discussed above, sending 318 the first portion of the IO request to the first node may include sending the first portion of the IO request to the first node via an IO request path defined 304 by volume segmentation process 10. Additionally, sending 320 the second portion of the IO request to the second node may include sending the second portion of the IO request to the second node via an IO request path defined 304 by volume segmentation process 10. In this manner, the various portions of the IO request that refer to different segments may be processed by different nodes. As such, the processing efficiency of the storage system may be improved.

Referring again to the example of FIG. 4, suppose an IO request (e.g., IO request 440) is received at multipath driver 64 and references a first segment (e.g., segment 402) assigned to a first node (e.g., storage processor 100) and a second segment (e.g., segment 404) assigned to a second node (e.g., storage processor 124). In this example, volume segmentation process 10 may, via multipath driver 64, divide 316 IO request 440 into a first portion (e.g., first portion 442) referencing the first segment (e.g., segment 402) and a second portion (e.g., second portion 444) referencing the second segment (e.g., segment 404). Volume segmentation process 10 may, via multipath driver 64, send 318 first portion 442 of IO request 440 to the first node (e.g., storage processor 100) via an IO request path defined for the first node. In this example, volume segmentation process 10 may forward first portion 442 of IO request 440 to storage processor 100. Volume segmentation process 10 may process first portion 442 of IO request 440 via the first node (e.g., storage processor 100). Volume segmentation process 10 may send 320 second portion 444 of IO request 440 to the second node (e.g., storage processor 124) via an IO request path defined for the second node. Volume segmentation process 10 may process second portion 444 of IO request 440 via the second node (e.g., storage processor 124). While an example of e.g., two segments assigned to e.g., two nodes has been provided, it will be appreciated that an IO request referencing any number of segments assigned to any number of nodes may be divided and processed within the scope of the present disclosure.

In some implementations, storing 306, at a node, the metadata associated with the one or more segments assigned to the node may include storing 322, on each node, a copy of the metadata associated with the one or more segments assigned to each other node. In some implementations, volume segmentation process 10 may generate 324 a shared lock for each page of the metadata associated with the one or more segments. For example, volume segmentation process 10 may store 322 a copy of the metadata associated with a particular segment, on each node. In some implementations, volume segmentation process 10 may generate 324 a lock per page of metadata. Accordingly, the shared lock may be configured to allow one node to acquire ownership dynamically from the other node. In some implementations, volume segmentation process 10 may provide 326, to the node to which the one or more segments are assigned, ownership of the shared lock for each page of the metadata associated with the one or more segments. For example, a node may be provided 326 with all of the locks for metadata pages corresponding to segments assigned to that node. In some implementations, a multipath driver may direct or send IO requests to a node that owns the locks. However, if an IO request ends up in the wrong node, volume segmentation process 10 may allow a node to acquire the lock via node-to-node communication.

Referring also to the example of FIG. 5 and in some implementations, volume segmentation process 10 may store a copy of the metadata associated with the one or more segments assigned to each other node. In this example, volume segmentation process 10 may store 322 a copy of metadata 420, 422, 424 on storage processor 100 (e.g., copy of metadata 500, 502, 504) and a copy of metadata 414, 416, 418 on storage processor 124 (e.g., copy of metadata 506, 508, 510). Volume segmentation process 10 may generate 324 a shared lock for each page of the metadata associated with the one or more segments. For example, volume segmentation process 10 may generate 324 a shared lock on metadata 414, 416, 418, 420, 422, 424 such that one of storage processor 100 and storage processor 124 may acquire ownership dynamically from the other storage processor. In some implementations, the shared lock may be generated 324 per metadata page. In some implementations, volume segmentation process 10 may provide 326, to storage processor 100, ownership of the shared lock for each page of the metadata associated with the one or more segments assigned to the node (e.g., ownership of the shared lock for metadata pages 414, 416, 418) and may provide 326, to storage processor 124, ownership of the shared lock for each page of the metadata associated with the one or more segments assigned to the node (e.g., ownership of the shared lock for metadata pages 420, 422, 424).

In some implementations, volume segmentation process 10 may identify 328 a node failure within the multi-node storage system, thus defining at least one failed node. A node failure may generally include any failure (e.g., hardware and/or software) and/or identified inaccessibility of the node. In some implementations, volume segmentation process 10 may reassign 330 the one or more segments assigned to the at least one failed node to one or more surviving nodes. For example, in case of a node failover, the entire state of the volume (e.g., data and meta data) may (as discussed above) be persisted on a storage device that is available to each node, allowing the one or more surviving nodes to resume IO requests and to take over the segments of the at least one failed node. In some implementations, when reassigning 330 the one or more segments to the one or more surviving nodes, volume segmentation process 10 may store metadata associated with the one or more reassigned segments and/or cache user data associated with the one or more reassigned segments on the surviving node.

Referring again to the example of FIG. 4 and in some implementations, volume segmentation process 10 may identify that storage processor 100 has failed. In response to identifying 328 that storage processor 100 has failed, volume segmentation process 10 may obtain, via storage processor 124, the segments assigned to storage processor 100 (e.g., segments 402, 406, 410) from data array 112 and reassign 330 the segments to storage processor 124. In this manner, storage processor 124 may process any IO requests referencing segments 402, 406, and 410.

While examples have been provided of assigning a plurality of segments between two nodes, it will be appreciated that any number of nodes may be used within the scope of the present disclosure. For example and in some implementations, volume segmentation process 10 may divide metadata ownership among multiple CPUs (e.g., in the form of address-to-hash tables). For example, performance may be improved when IO requests arrive at a CPU that is assigned ownership of the metadata, otherwise the IO request may be forwarded (via internal bandwidth) to the CPU assigned ownership of the metadata. In some implementations, metadata ownership may be defined in terms of slices, where the entire metadata address space is divided into e.g., 1024 slices, and each slice may be assigned to one of the CPUs.

In some implementations, a multipath driver may direct an IO request to the CPU that is assigned ownership of the metadata, which may result in higher IO request processing performance.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
dividing a volume into a plurality of segments;
assigning the plurality of segments to a plurality of nodes of a multi-node storage system, thus defining one or more assigned nodes and one or more unassigned nodes for each segment of the plurality of segments; and
defining one or more input/output (IO) request paths for accessing the plurality of segments based upon, at least in part, assigning the plurality of segments to the plurality of nodes and a type of data of an IO request, wherein the type of data of the IO request includes one or more of an IO request referencing meta data of a particular segment and an IO request referencing user data of a particular segment, wherein defining the one or more IO request paths for accessing the plurality of segments includes defining one or more primary IO request paths for accessing each segment from the assigned node and defining one or more non-primary IO request paths for accessing each segment from at least one unassigned node of the plurality of nodes, wherein the one or more primary IO request paths include one or more IO request paths from a host initiating the IO request to the assigned node, wherein the one or more non-primary IO request paths include one or more IO request paths from the host initiating the IO request to the unassigned node and from the unassigned node to the assigned node.

2. The computer-implemented method of claim 1, further comprising one or more of:
storing, at a node, metadata associated with one or more segments assigned to that node; and
caching, at the node, user data associated with the one or more segments assigned to that node.

3. The computer-implemented method of claim 1, further comprising:
receiving the IO request referencing at least one segment of the plurality of segments;
determining a node to which the at least one segment is assigned; and
sending the IO request to the node to which the at least one segment is assigned via the primary IO request path to the node to which the at least one segment is assigned.

4. The computer-implemented method of claim 3, wherein the IO request references a first segment assigned to a first node and a second segment assigned to a second node.

5. The computer-implemented method of claim 4, further comprising:
dividing the IO request into a first portion referencing the first segment assigned to the first node and a second portion referencing the second segment assigned to the second node;
sending the first portion of the IO request to the first node via the primary IO request path defined for the first portion of the IO request; and
sending the second portion of the IO request to the second node via the primary IO request path defined for the second portion of the IO request.

6. The computer-implemented method of claim 2, storing, at a node, the metadata associated with the one or more segments assigned to the node includes:
storing, on each node, a copy of the metadata associated with the one or more segments assigned to each other node;
generating a shared lock for each page of the metadata associated with the one or more segments; and
providing, to the node to which the one or more segments are assigned, ownership of the shared lock for each page of the metadata associated with the one or more segments assigned to the node.

7. The computer-implemented method of claim 1, further comprising:
identifying a node failure within the multi-node storage system, thus defining at least one failed node; and
reassigning one or more segments assigned to the at least one failed node to one or more surviving nodes.

8. A computer program product residing on a non-transitory computer readable medium having a plurality of instructions stored thereon which, when executed by a processor, cause the processor to perform operations comprising:
dividing a volume into a plurality of segments;
assigning the plurality of segments to a plurality of nodes of a multi-node storage system, thus defining one or more assigned nodes and one or more unassigned nodes for each segment of the plurality of segments; and
defining one or more input/output (IO) request paths for accessing the plurality of segments based upon, at least in part, assigning the plurality of segments to the plurality of nodes and a type of data of an IO request, wherein the type of data of the IO request includes one or more of an IO request referencing meta data of a particular segment and an IO request referencing user data of a particular segment, wherein defining the one or more IO request paths for accessing the plurality of segments includes defining one or more primary IO request paths for accessing each segment from the assigned node and defining one or more non-primary IO request paths for accessing each segment from at least one unassigned node of the plurality of nodes, wherein the one or more primary IO request paths include one or more IO request paths from a host initiating the IO request to the assigned node, wherein the one or more non-primary IO request paths include one or more IO request paths from the host initiating the IO request to the unassigned node and from the unassigned node to the assigned node.

9. The computer program product of claim 8, wherein the operations further comprise one or more of:
storing, at a node, metadata associated with one or more segments assigned to that node; and
caching, at the node, user data associated with the one or more segments assigned to that node.

10. The computer program product of claim 9, wherein the operations further comprise:

receiving the IO request referencing at least one segment of the plurality of segments;

determining a node to which the at least one segment is assigned; and sending the IO request to the node to which the at least one segment is assigned via the primary IO request path to the node to which the at least one segment is assigned.

11. The computer program product of claim 10, wherein the IO request references a first segment assigned to a first node and a second segment assigned to a second node.

12. The computer program product of claim 11, wherein the operations further comprise:

dividing the IO request into a first portion referencing the first segment assigned to the first node and a second portion referencing the second segment assigned to the second node;

sending the first portion of the IO request to the first node via the primary IO request path defined for the first portion of the IO request; and sending the second portion of the IO request to the second node via the primary IO request path defined for the second portion of the IO request.

13. The computer program product of claim 9, storing, at the node, the metadata associated with the one or more segments assigned to the node includes:

storing, on each node, a copy of the metadata associated with the one or more segments assigned to each other node;

generating a shared lock for each page of the metadata associated with the one or more segments; and providing, to the node to which the one or more segments are assigned, ownership of the shared lock for each page of the metadata associated with the one or more segments assigned to the node.

14. The computer program product of claim 8, wherein the operations further comprise:

identifying a node failure within the multi-node storage system, thus defining at least one failed node; and reassigning one or more segments assigned to the at least one failed node to one or more surviving nodes.

15. A computing system comprising:

a memory; and a processor configured to divide a volume into a plurality of segments, wherein the processor is further configured to assign the plurality of segments to a plurality of nodes of a multi-node storage system, thus defining one or more assigned nodes and one or more unassigned nodes for each segment of the plurality of segments, and wherein the processor is further configured to define one or more input/output (IO) request paths for accessing the plurality of segments based upon, at least in part, assigning the plurality of segments to the plurality of nodes and a type of data of an IO request, wherein the type of data of the IO request includes one or more of an IO request referencing meta data of a particular segment and an IO request referencing user data of a particular segment, wherein defining the one or more IO request paths for accessing the plurality of segments includes defining one or more primary IO request paths for accessing each segment from the assigned node and defining one or more non-primary IO request paths for accessing each segment from at least one unassigned node of the plurality of nodes, wherein the one or more primary IO request paths include one or more IO request paths from a host initiating the IO request to the assigned node, wherein the one or more non-primary IO request paths include one or more IO request paths from the host initiating the IO request to the unassigned node and from the unassigned node to the assigned node.

16. The computing system of claim 15, wherein the processor is further configured to one or more of:

store, at a node, metadata associated with one or more segments assigned to that node; and cache, at the node, user data associated with the one or more segments assigned to that node.

17. The computing system of claim 16, wherein the processor is further configured to:

receive the IO request referencing at least one segment of the plurality of segments;

determine a node to which the at least one segment is assigned; and sending the IO request to the node to which the at least one segment is assigned via the primary IO request path to the node to which the at least one segment is assigned.

18. The computing system of claim 17, wherein the IO request references a first segment assigned to a first node and a second segment assigned to a second node.

19. The computing system of claim 18, wherein the processor is further configured to:

divide the IO request into a first portion referencing the first segment assigned to the first node and a second portion referencing the second segment assigned to the second node;

sending the first portion of the IO request to the first node via the primary IO request path defined for the first portion of the IO request; and sending the second portion of the IO request to the second node via the primary IO request path defined for the second portion of the IO request.

20. The computing system of claim 16, storing, at a node, the primary copy of the metadata associated with the one or more segments assigned to the node includes:

store, on each node, a copy of the metadata associated with the one or more segments assigned to each other node;

generate a shared lock for each page of the metadata associated with the one or more segments; and provide, to the node to which the one or more segments are assigned, ownership of the shared lock for each page of the metadata associated with the one or more segments assigned to the node.

* * * * *